United States Patent [19]

Stone

[11] Patent Number: 4,641,979
[45] Date of Patent: Feb. 10, 1987

[54] BEARING SYSTEM FOR FRACTIONAL HORSEPOWER ELECTRIC MOTORS

[75] Inventor: Thomas W. Stone, Owosso, Mich.

[73] Assignee: Universal Electric Company, Owosso, Mich.

[21] Appl. No.: 640,980

[22] Filed: Aug. 15, 1984

[51] Int. Cl.⁴ ............................................. F16C 25/04
[52] U.S. Cl. .................................................. 384/146
[58] Field of Search ............... 384/146, 147, 145, 214, 384/209, 210

[56] References Cited

U.S. PATENT DOCUMENTS

| | | | |
|---|---|---|---|
| 3,002,794 | 10/1961 | Bluemink | 384/214 |
| 3,320,006 | 5/1967 | Cozzarin | 384/127 |
| 3,332,727 | 7/1967 | Gandrud | 384/214 |
| 3,873,166 | 3/1975 | Berg et al. | 384/146 |

Primary Examiner—Lenard A. Footland
Attorney, Agent, or Firm—Barnes, Kisselle, Raisch, Choate, Whittemore & Hulbert

[57] ABSTRACT

A bearing system for fractional horsepower electric motors which comprises a shell supporting a stator, end members closing the ends of the shell, a shaft supporting a rotor within the stator and a bearing system on the end members rotatably supporting the shaft, the bearing system comprises a bearing member on said shaft that engages a seat on the end member, and a spring yieldingly urging the bearing member against the seat. An oil retainer is associated with the end member and longitudinally spaced seals having radially inwardly extending lips engage the shaft and isolate the oil retainer means and bearing with respect to the remainder of the shaft.

13 Claims, 4 Drawing Figures

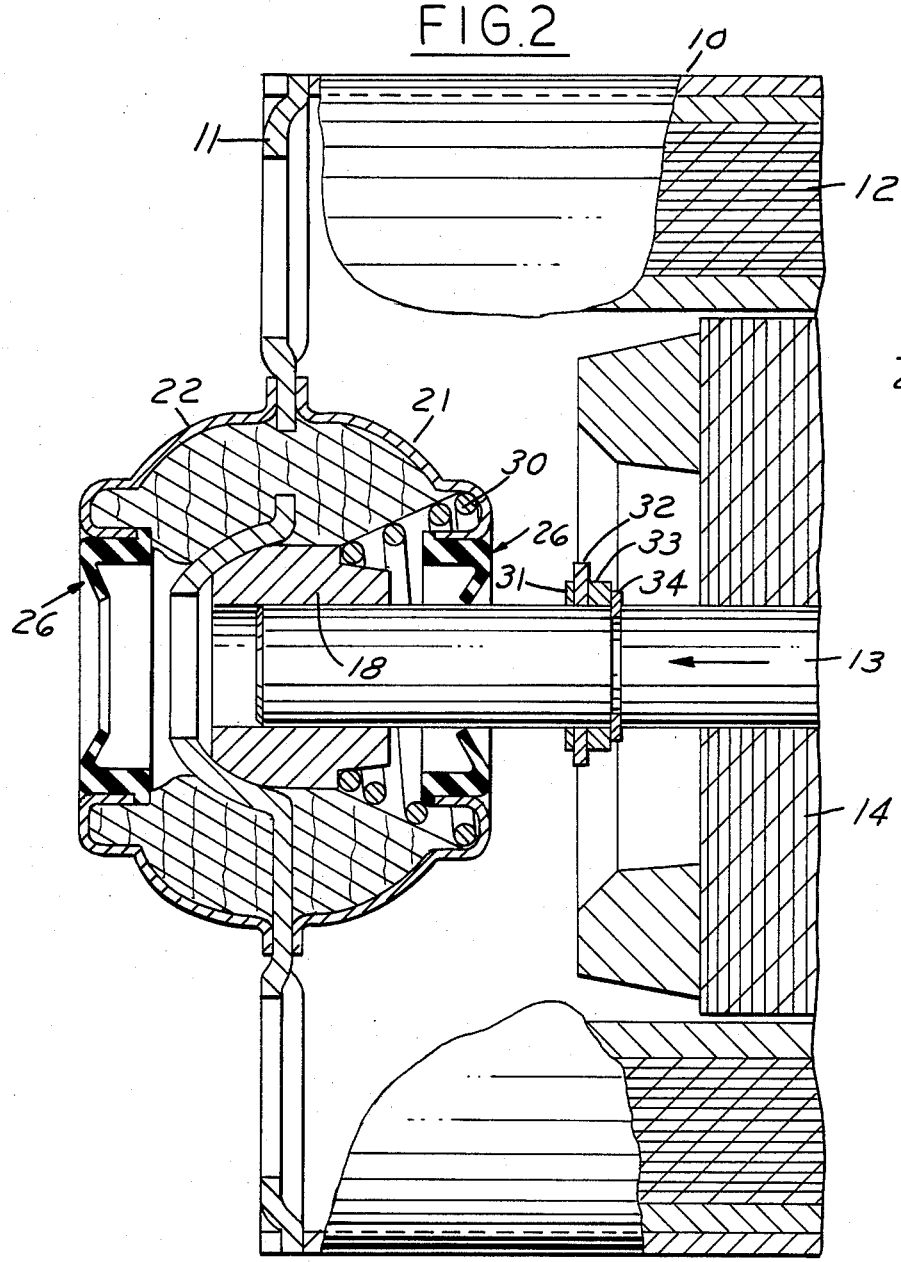
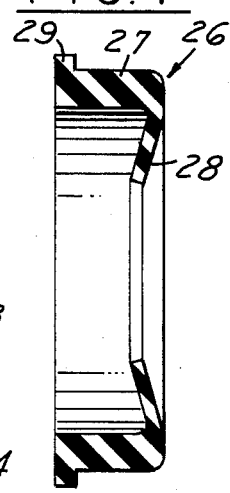
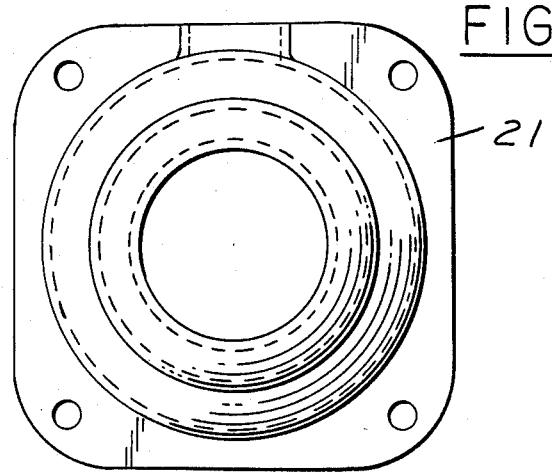

BEARING SYSTEM FOR FRACTIONAL HORSEPOWER ELECTRIC MOTORS

This invention relates to small electric motors such as fractional horsepower electric motors and particularly to bearing systems for such motors.

BACKGROUND AND SUMMARY OF THE INVENTION

Where small electric motors are subjected to environments having airborne water particles such as in the area of air conditioners, it is common practice to prevent entry of the water particles into the bearing system by providing external slingers which deflect the water ourwardly away from the shaft and to add internal slingers under an external oil catcher to prevent direct contact of the water with the oil retaining system such as the felt. However, the water often tends to enter the bearing system displacing the oil and limiting the life of the bearing. In some instances, lip seals have been provided on the outboard shaft extension. Little or no effort has been used to seal the internal or motor side of the bearing system other than to make the motor totally enclosed so that water or dust will not enter.

As a result of these conditions, the life of the motors has been limited. Increasing cost of replacement has produced a demand for electric motors that have longer life.

Accordingly, among the objectives of the present invention are to provide a bearing system for small electric motors which isolates the oil system both internally and externally from penetration by the environment; which is simple to construct and utilizes identical parts as much as possible; which can be readily assembled, which does not require the total enclosure of the motor with the added cost of a cooling system or added copper or steel to provide adequate cooling.

DESCRIPTION OF THE DRAWINGS

FIG. 2 is a view of a portion of the motor during assembly.

FIG. 3 is a plan view of an oil retainer part.

FIG. 4 is a sectional view through a seal.

DESCRIPTION

Figure 1:
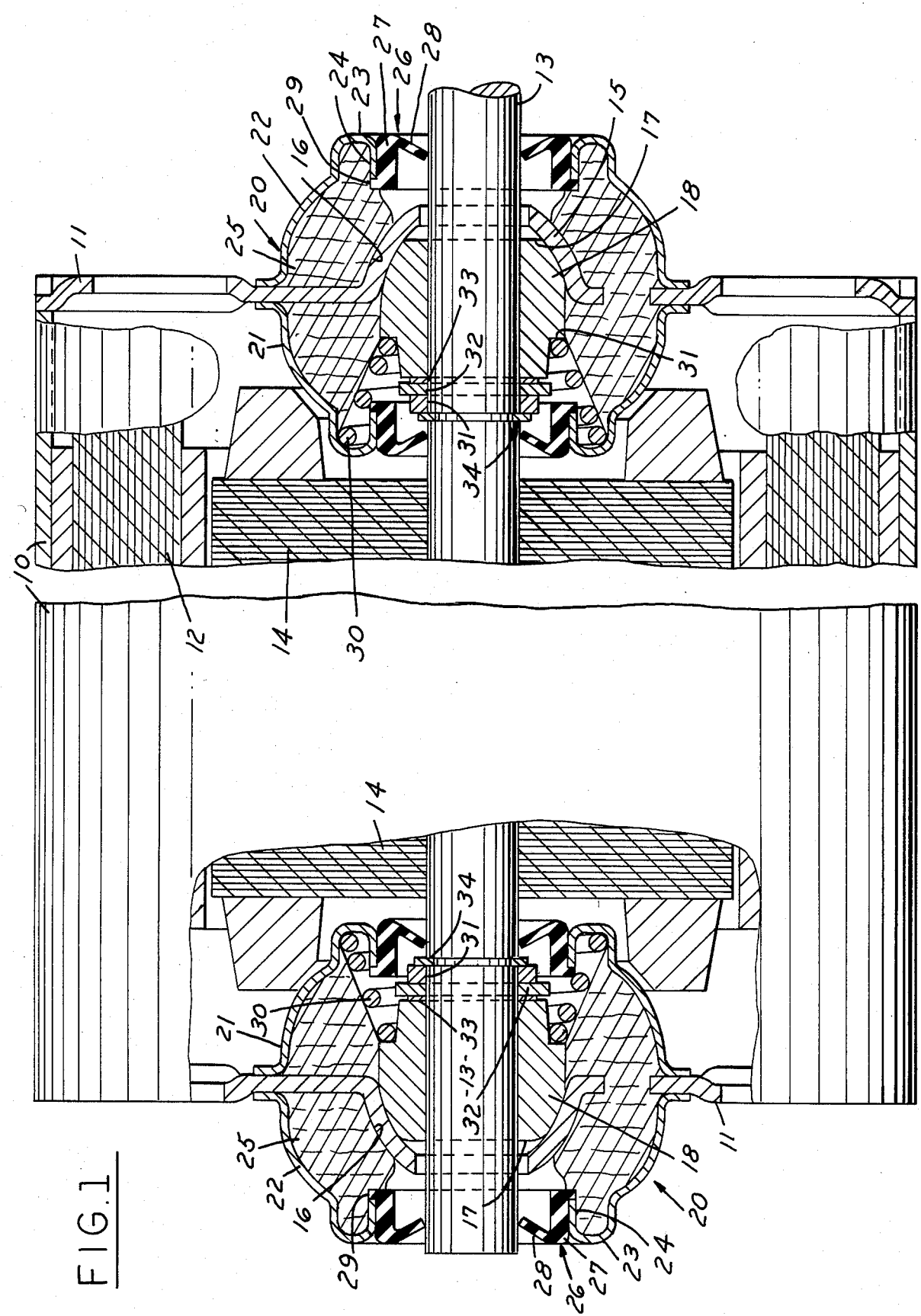
FIG. 1 is a fragmentary part sectional view of an electric motor embodying the invention.

Referring to FIG. 1, the electric motor embodying the invention comprises a fractional horsepower electric motor including a housing or frame having a cylindrical metal shell 10 and end members 11 fastened to the shell in a manner as set forth in U.S. Pat. No. 3,567,973 which is incorporated herein by reference.

The shell 10 supports the stator 12. The electric motor further includes a shaft 13 that supports a rotor 14 in the end members 11, as presently described.

Each end member 11 includes a deformed portion 15 defining a spherical seat 16 engaged by a complementary surface 17 of a bearing member 18. An oil catcher 20 which may be made up of two catcher members 21 and which may be of identical construction is provided on the opposite surfaces of the end member 11 as by welding. Each catcher 21, 22 is generally hemispherical and includes a radially inwardly extending wall 23 and an axially inwardly extending flange 24. An oil impregnated medium 25 such as felt, plastic or wood fiber is interposed between the bearing 18 and the inner catcher member 21 and between the exterior of the deformed portion 15 and the interior of the catcher member 22.

Lip seals 26 (FIG. 4) are provided on each catcher member 21, 22. Each lip seal 26 includes an axially extending cylindrical portion 27 and a radially inwardly and axially extending lip 28. A flange 29 engages the flange 24 to limit the axially outward movement of each seal. (FIG. 1) The inner lip seals have lips 28 extending axially outwardly and the outer lip seals have lips 28 extending axially inwardly.

A spring 30 herein shows as a frustoconical coil spring is interposed between a shoulder 31 on bearing member 18 and the inner catcher member 21 to urge the bearing 18 against its seat 16.

The shaft 13 includes washers 31, 32, 33 that are urged against the end member by a snap ring 34 in a groove on the shaft 13 or by a shoulder or collar on the shaft.

Referring to FIG. 2, in assembly, the catcher members 21, 22, feet 25, bearing 18, spring 30 and seals 26 are provided on the end member 11 and the end member 11 is attached to the shell 10. The shaft 13 with the washers 31, 32, 33 and snap ring 34 thereon is then moved axially through the shell 10 and into the opening 18a of the bearing member 18 deflecting the lip 28 of the inner seal 26 until the washers are brought into engagement with the bearing member 18.

Where the shaft does not extend through both ends of the motor housing and one end of the motor housing, only an internal lip seal need be provided.

It can thus be seen that the bearing system provides for sealing of the bearing and isolating the bearing as well as the oil reservoir from penetration by any external environment. The lip seal engaging the shaft prevents the passage of water or dust particles, and even after the lip seal has worn, a continual line to line contact with the shaft is maintained. Since the oil retention medium is completely confined when seals are used at both ends and need not be frequently replenished, costlier synthetic oils which have greater resistance to high temperatures can be used.

The bearing system is simple, utilizes a minimum number of parts, some of the parts being identical, and can be readily assembled. The use of a thrust washer which is made of resilient material facilitates the assembly.

The utilization of polyester for slot liners in the stator and rotor and polyester coated films on the magnet wire permits the motor to withstand environmental moistures. Inasmuch as the motor need not be totally enclosed, it is not necessary to provide a cooling system.

I claim:

1. A bearing system for fractional horsepower electric motors which comprises a shell supporting a stator, end members closing the ends of the shell, a shaft supporting a rotor within the stator and a bearing system on the end members rotatably supporting the shaft, said bearing system comprising a bearing member on said shaft and having an outer end and an inner end, said end member having a seat for engagement by the outer end of said bearing member, spring means yieldingly urging the bearing member against the seat, oil slinger means on said shaft adjacent the inner end of said bearing member, oil retention means associated with said end member and at least one inner seal adjacent one end of said rotor axially inwardly of said oil slinger means and having a radially inwardly extending deflectable lip for engaging the shaft and isolating the oil slinger means, oil retaining means and bearing with respect to the remainder of the shaft.

2. The bearing system set forth in claim 1 wherein said lip of said inner seal oil slinger means on said shaft adjacent the inner end of said bearing member axially outwardly with respect to the shaft.

3. The bearing system set forth in claim 2 wherein said oil retention means comprises an oil impregnated medium.

4. The bearing system set forth in claim 3 wherein said means for isolating said oil retention means includes a catcher on said end member externally of said oil impregnated medium.

5. The bearing system set forth in claim 4 wherein said catcher comprises a pair of members on opposite sides of said end member surrounding said oil impregnated medium.

6. The bearing system set forth in claim 5 wherein said seal is positioned in an opening in one of said catcher members, said seal having portions thereof engaging said catcher member for preventing relative axial movement of said seal relative to said catcher member.

7. The bearing system set forth in claim 6 wherein said spring means is interposed between said bearing and said catcher members.

8. The bearing system set forth in claim 7 wherein said spring means comprises a frustoconical helical compression spring.

9. The bearing system set forth in claim 8 wherein said seal includes a first axial cylindrical portion from which said radially extending lip extends and a radially outwardly extending lip portion engaging a portion of said catcher.

10. The bearing system set forth in claim 9 wherein said shaft supports washers defining said oil slinger means engaging said bearing member and means on said shaft preventing said washers from moving axially inwardly relative to said shaft.

11. The bearing system set forth in claim 1 including a second bearing member, a second oil slinger means and a second oil retention means at the other end of the motor and a second inner seal adjacent the inner end of said rotor having a radially inwardly extending lip for engaging said shaft and isolating said second oil slinger means and said second oil retention means and second bearing at the other end of said motor with respect to the remainder of said shaft.

12. The bearing system set forth in claim 11 wherein said lip of said second seal extends axially outwardly with respect to the shaft.

13. The bearing system set forth in claim 12 including outer seals adjacent the inner seals, respectively, each outer seal having a lip that extends radially inwardly and axially inwardly with respect to the shaft and cooperates with the adjacent inner seal to isolate the respective oil retention means and bearing.

* * * * *